(12) United States Patent
Dockter

(10) Patent No.: US 11,629,577 B2
(45) Date of Patent: Apr. 18, 2023

(54) SYSTEMS AND METHODS OF CARBON DIOXIDE REMOVAL WITH PERMANENT SUBSEA SEQUESTRATION

(71) Applicant: Seaquest CCS, LLC, New York, NY (US)

(72) Inventor: Daniel Dockter, New York, NY (US)

(73) Assignee: SEAQUEST CCS, LLC, New York, NY (US)

(*) Notice: Subject to any disclaimer, the term of this patent is extended or adjusted under 35 U.S.C. 154(b) by 0 days.

(21) Appl. No.: 17/674,881

(22) Filed: Feb. 18, 2022

(65) Prior Publication Data
US 2022/0268129 A1 Aug. 25, 2022

Related U.S. Application Data

(60) Provisional application No. 63/151,818, filed on Feb. 22, 2021.

(51) Int. Cl.
*E21B 41/00* (2006.01)
*B01D 53/00* (2006.01)

(52) U.S. Cl.
CPC .......... *E21B 41/0064* (2013.01); *B01D 53/00* (2013.01)

(58) Field of Classification Search
CPC ............ E21B 41/0064; B01D 2258/06; B01D 2257/504; B01D 53/1475; Y02C 20/00; Y02C 20/40; F17C 1/007
See application file for complete search history.

(56) References Cited

U.S. PATENT DOCUMENTS

| 4,031,919 A | 6/1977 | Ortloff et al. |
| 2003/0168864 A1* | 9/2003 | Heronemus ............. F03D 9/255 290/55 |

(Continued)

FOREIGN PATENT DOCUMENTS

GB 2470122 B 12/2013

OTHER PUBLICATIONS

International Search Report and Written Opinion dated May 12, 2022 in related International Patent Application No. PCT/US2022/016889.

(Continued)

*Primary Examiner* — Carib A Oquendo
(74) *Attorney, Agent, or Firm* — Eric L. Lane; Green Patent Law

(57) ABSTRACT

Systems and methods of greenhouse gas removal and subsea sequestration are described herein. Disclosed systems and methods include a direct air capture device capturing greenhouse gases from the atmosphere, a transport apparatus fluidly connected to the at least one direct air capture device, an underwater disposal well fluidly connected to the transport apparatus, and an underwater work apparatus operatively connected to the underwater disposal well. The transport apparatus transfers the greenhouse gases to the underwater disposal well, and the underwater disposal well injects the greenhouse gases into an underwater geologic formation. The greenhouse gases may be solidified as mineral deposits and permanently stored in the underwater geologic formation. Disclosed systems may include a loading system configured to be periodically connected to the transport apparatus. The loading system has a plurality of rotatable joint modules connected by independently actuatable joints.

19 Claims, 6 Drawing Sheets

(56) References Cited

U.S. PATENT DOCUMENTS

| | | | |
|---|---|---|---|
| 2008/0202921 A1* | 8/2008 | Wilkinson | C25B 1/04 |
| | | | 204/247 |
| 2010/0084283 A1 | 4/2010 | Gomez | |
| 2010/0318337 A1 | 12/2010 | Bailey et al. | |
| 2015/0004084 A1 | 1/2015 | Goldberg | |
| 2015/0121869 A1* | 5/2015 | McAlister | C07C 29/151 |
| | | | 422/162 |
| 2015/0315879 A1* | 11/2015 | Williams | E21B 7/124 |
| | | | 166/339 |
| 2017/0204704 A1* | 7/2017 | Sommerfield | E21B 43/017 |
| 2018/0106138 A1 | 4/2018 | Randolph | |
| 2018/0161719 A1 | 6/2018 | Peng | |
| 2021/0054701 A1* | 2/2021 | Holck | E21B 19/087 |

OTHER PUBLICATIONS

Holmes, Carbon Engineering Introduction (Dec. 11, 2019).
Lindtvelt, Deep Purple (Sep. 5, 2019).
Matter et al, CarbFix CO2 Injection Pilot Project, Iceland (2009).
Canrig Robotics, Drill Floor Robot DFR-1500.
Canrig Robotics, Robotic Pipe Handler RPH-7000.
Canrig Sigma Top Drive Brochure (2021).
TechnipFMC Schilling Robotics Gemini ROV System data sheet (2021).
Canrig Robotics Robotic Roughneck RRN-250.

* cited by examiner

SYSTEMS AND METHODS OF CARBON DIOXIDE REMOVAL WITH PERMANENT SUBSEA SEQUESTRATION

CROSS-REFERENCE TO RELATED APPLICATION

This application is a non-provisional of and claims priority to U.S. Patent Application Ser. No. 63/151,818, filed Feb. 22, 2021, which is hereby incorporated by reference in its entirety.

FIELD OF THE DISCLOSURE

The present disclosure relates to systems and methods of greenhouse gas removal and sequestration. The disclosure further relates to systems and methods of removing greenhouse gases from air and permanently sequestering the greenhouse gases in subsea geologic formations.

BACKGROUND

Due to the enormous amount of excess carbon dioxide ($CO_2$) already in the atmosphere, decarbonization of the world's energy, transportation, industrial, and agricultural systems alone would not be sufficient to avoid the worst effects of climate change. The Intergovernmental Panel on Climate Change (IPCC) has stated that "carbon dioxide removal (CDR) technologies will be critical to get rid of 100 to 1000 gigatons of $CO_2$ this century." Therefore, to prevent further negative impacts of climate change, much of the carbon dioxide already in the Earth's atmosphere must be removed and safely stored permanently.

If all $CO_2$ above 300 parts per million (PPM) in the atmosphere is to be removed, the scale of the storage or sequestration required is far beyond the capacity of any single technology, including air-to-fuel technology, enhanced rock weathering (ERW), and all the current industrial and commercial uses of $CO_2$, combined. While work is underway in the areas of carbon capture and sequestration (CCS), there is little development effort going into processes for the inverse transport and safe disposal or storage of previously produced carbon compounds at scales required to meet the IPCC's target.

While costs for deepwater fields can vary greatly, a typical deepwater subsea oil and gas production field can cost billions of dollars to develop. The largest capital expenditures for deepwater well drilling and field development are installation and equipment costs, respectively. Such high levels of expenditure associated with subsea production are not economically feasible for most types of subsea sequestration, such as where a produced reservoir which previously contained oil and/or gas is used to store $CO_2$. This is the current approach of competing methods to sequester $CO_2$ offshore.

Accordingly, there is a need for a scalable and repeatable system and method to remove vast amounts of carbon dioxide from the atmosphere and to permanently store it. There is also a need for a system and method for transporting and safely sequestering carbon dioxide. There is a need for a carbon capture method that does not need a single location or a produced reservoir so costs can be spread across a large field deployment. There is also a need for systems and methods that effectively integrate multiple technologies in novel and non-obvious ways to extract greenhouse gases from the atmosphere, transport them to suitable geologic formations, and permanently sequester them in those geologic formations.

SUMMARY

Disclosed embodiments alleviate these problems by providing a new, integrated, end-to-end process for the physical disposal of $CO_2$—starting with Direct-Air-Capture (DAC) and ending with solid sequestration—that utilizes advanced automation, robotics, reusable field components, and optional bilaterally laden transport methods. Exemplary embodiments accomplish this at the lowest cost through the inverse application and integration of oil and gas technologies designed for mass-scale production, transport, and processing of carbon-based compounds. This integration of subsystems/components/processes allows the use of subprocesses for an aggregated high-level process.

To enable carbon dioxide removal (CDR) at the scales necessary to remove the amounts of $CO_2$ from the Earth's atmosphere sufficient to prevent or reverse the most severe climate impacts, multiple processes and technologies for CDR, transport, disposal, and solidified sequestration have been integrated and amplified using key robotics and automation technologies to offer the fastest, most impactful, and lowest-cost end-to-end CDR method. New robotic offshore drilling and subsea automation technologies provide significant time and cost reduction over processes using non-automated drilling, completion, and subsea manipulation systems. One of the novel aspects of disclosed processes is that they primarily utilize DAC instead of only source-captured $CO_2$ (such as from a flue stack). DAC $CO_2$ is carbon negative when powered with renewable energy sources where the $CO_2$ is then solidified and permanently sequestered rather than refined and consumed.

Disclosed methods of carbon capture do not require a single, precise site location or a depleted reservoir. Instead, with the disclosed processes such expenses can be allocated more generally, making the economics feasible. The integral systems outperform inland $CO_2$ transport due to the increased scale and efficiency of the integral systems' over- and underwater $CO_2$ transport. Also, disclosed systems can be located in the U.S. maritime zone approved for 45Q tax incentive. Adding to exemplary embodiments' economic advantages are their use of (i) advanced automation, (ii) repeatable well type and field layout, (iii) solidified (mineralization) $CO_2$ disposal allowing short-term monitoring, and (iv) rapid hardware refurbishment and reuse, and production of compounds or elements for bilateral transport.

The most significant factor to achieve the levels of $CO_2$ sequestration required to halt and/or reverse the impacts of climate change is the scalability of disclosed systems and methods. Disclosed processes achieve such scalability dues to their relatively low cost per ton of $CO_2$ stored and the ability to rapidly drill, complete, and fill subsea sequestration reservoirs with the captured $CO_2$—and subsequently to repeat that process many times in an automated way relying on disclosed standardized configurations and the refurbishment/reuse of subsea field hardware. Such repeatability relies on the disclosed proprietary systems and methods.

An exemplary system of greenhouse gas removal and subsea sequestration comprises at least one direct air capture device, at least one transport apparatus configured to be fluidly connected to the at least one direct air capture device, at least one underwater disposal well configured to be fluidly connected to the at least one transport apparatus, and at least one underwater work apparatus configured to work with the at least one underwater disposal well. The direct air capture device captures one or more greenhouse gases from the atmosphere. The transport apparatus transfers the greenhouse gases to the underwater disposal well, and the underwater disposal well injects the greenhouse gases into an underwater geologic formation.

In exemplary embodiments, the transport apparatus is one or more of a mobile surface vessel, a mobile underwater vessel, a tieback, or a pipeline. The direct air capture device may be located on a coast or offshore floating on a body of water. The system may comprise a robotic drilling system. In exemplary embodiments, the disposal well for the underground geologic formation is pre-drilled and completed. An exemplary system may also comprise a reverse osmosis freshwater production system, a renewable power source, and an electrolysis hydrogen and oxygen extraction system, and the system utilizes extracted hydrogen to store energy and provide power. A gas carrier docking turret or loading systems may be provided and be configured to dock a mobile surface vessel or a mobile underwater vessel.

An exemplary method of removing greenhouse gases from air and sequestering the greenhouse gases in subsea geologic formations comprises capturing one or more greenhouse gases from the atmosphere, transferring the one or more greenhouse gases to at least one underwater disposal well, injecting the one or more greenhouse gases into a pre-drilled and completed underwater geologic formation, and solidifying the one or more greenhouse gases as mineral deposits. The solidified greenhouse gases may be permanently stored in the underground geologic formation. In exemplary methods, the capturing of the greenhouse gases is performed over a body of water. The methods may include producing and storing hydrogen and utilizing the hydrogen to store energy and provide power.

Exemplary methods further comprise solidifying one or more greenhouse gases as mineral deposits and may include permanently storing the solidified greenhouse gases in the underground geologic formation. In exemplary embodiments, the first and second transport apparatus is one or more of a mobile surface vessel, a mobile underwater vessel, a tieback, or a pipeline. The methods may include producing and storing hydrogen and utilizing the hydrogen to store energy and provide power. The capturing of the greenhouse gases may be performed on a coast or offshore on or above a body of water.

These and other features and advantages will be appreciated from review of the following detailed description, along with the accompanying figures in which like reference numbers refer to like parts throughout.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the following detailed description of embodiments of the disclosure, reference is made to the accompanying drawings in which like references indicate similar elements, and in which is shown by way of illustration specific embodiments in which disclosed systems and devices may be practiced. These embodiments are described in sufficient detail to enable those skilled in the art to practice the embodiments, and it is to be understood that other embodiments may be utilized, and that logical, mechanical, functional, and other changes may be made without departing from the scope of the present disclosure. The following detailed description is, therefore, not to be taken in a limiting sense, and the scope of the present disclosure is defined only by the appended claims. As used in the present disclosure, the term "or" shall be understood to be defined as a logical disjunction and shall not indicate an exclusive disjunction.

Figure 1:
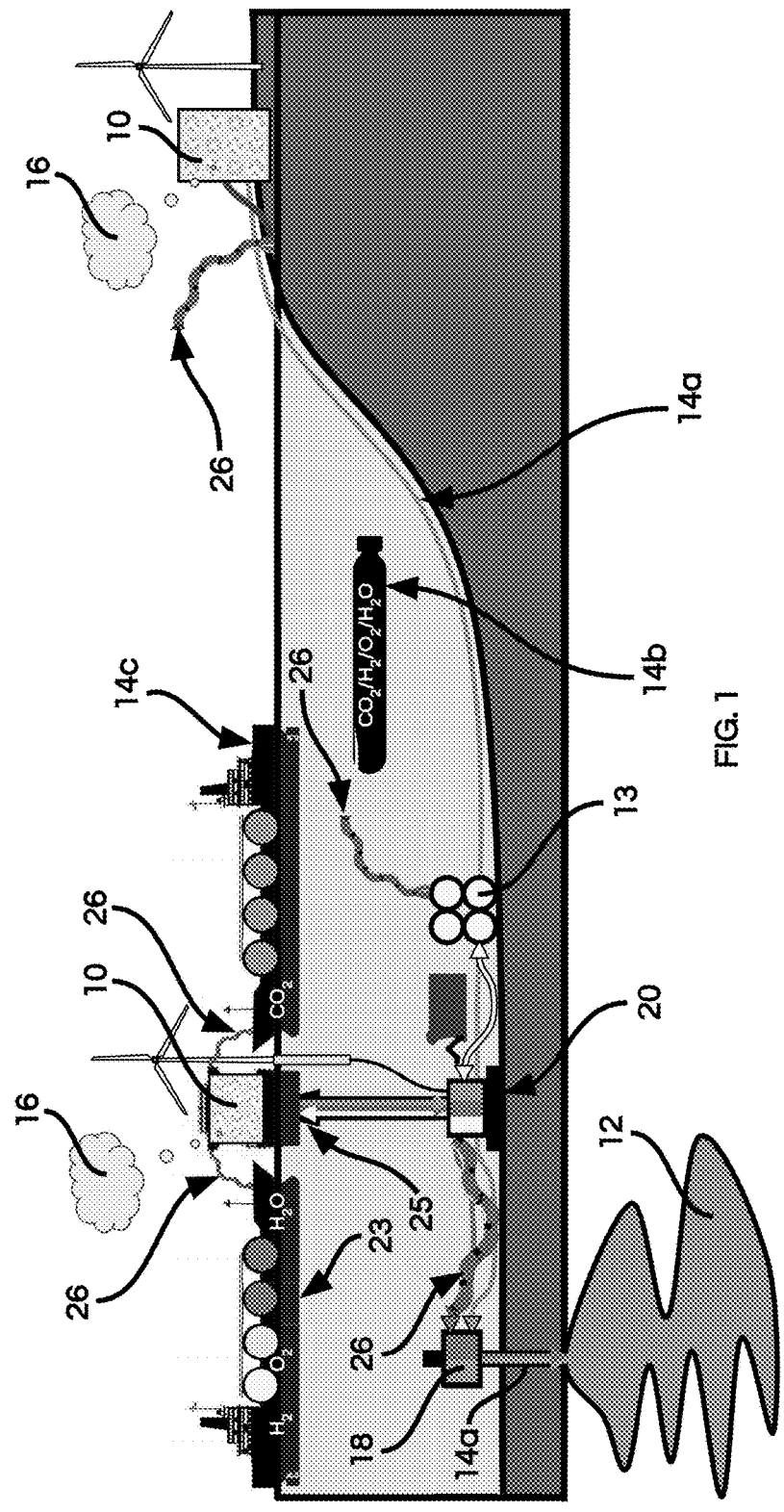
FIG. 1 is a side view of an exemplary system of greenhouse gas removal and permanent subsea sequestration in accordance with the present disclosure.

As shown in FIG. 1, an exemplary system 1 of greenhouse gas removal and subsea sequestration includes a direct air capture (DAC) device 10. Disclosed greenhouse gas removal and disposal subsystems, subprocesses, and methods start with the use of direct air capture to remove greenhouse gases 16 from the atmosphere by direct air capture device 10. The greenhouse gas 16 could be $CO_2$, methane, or any other now-known or later-discovered greenhouse gas. Most typically at the current time, the greenhouse gas being removed and sequestered would be carbon dioxide. The direct air capture device 10 could be located on the shore or coast close to the underwater geologic formation 12 where the greenhouse gases will be stored or could be designed to float on the body of water under which the geologic formation is located. In exemplary embodiments, direct air capture plants are operated in the highest-density areas of atmospheric $CO_2$ and near shore.

The $CO_2$ 16 captured by the DAC equipment 10 (whether onshore or offshore) is transported to its ultimate sequestration site. Exemplary systems 1 have a transport apparatus 14a, 14b, 14c, which can be fluidly connected to direct air capture device 10 so the greenhouse gases 16 extracted from the atmosphere and capture by the device 10 can be directed into the transport apparatus. Transport apparatus can be any moving vessel or stationary system suitable for transporting gases. In exemplary embodiments, transport apparatus is a mobile surface vessel 14c, a mobile underwater vessel 14b, a tieback, or a pipeline 14a. The captured $CO_2$ 16 is then transported over and/or through the body of water via transport apparatus 14a, 14b, 14c, e.g., surface or subsea vessels and/or pipelines, to the underwater geologic formation 12. As discussed in more detail herein, transport apparatus 14a, 14b, 14c also can provide bilateral laden transport and are carbon-neutral when powered by renewable energy.

In exemplary embodiments, an underwater disposal well 18 is provided. The disposal well 18 may be located in water of any depths, and in exemplary embodiments in depths of 4,000 m or less. The disposal well 18 is in fluid connection with the transport apparatus 14a, 14b, 14c or configured to be temporarily fluidly connected to the transport apparatus. The type of connection is known to those skilled in the art and depends on which transport apparatus is utilized; a pipeline might have a different type of connection than a mobile vessel. The underwater disposal well 18 is located above the underwater geologic formation 12 and injects the $CO_2$ deep underground into the formation.

Exemplary embodiments may utilize various types of wells, including but not limited to, Class I and Class VI wells. Class I wells are used for disposal of drilling byproducts below the water table. Class VI wells are used for the storage of supercritical gases such as $CO_2$ in reservoirs that contain caprock to prevent re-release outside of the geologic storage reservoir. While the technologies outlined in this description can also be utilized with Class VI sequestration wells for substantial efficiency gains over conventional drilling and sequestration methods, extreme efficiency gains are further achieved when these technologies are configured to the disclosed processes and used for Class I disposal wells due to decreased regulatory requirements and termination of well monitoring after 2-5 years. By contrast, Class VI wells (which do not utilize mineralization) achieve sequestration by storing supercritical gas contained by well-bore plugs and caprock; thus, Class VI wells may require long-term monitoring to detect any leakage of the sequestered $CO_2$ from the formation.

Figure 5:
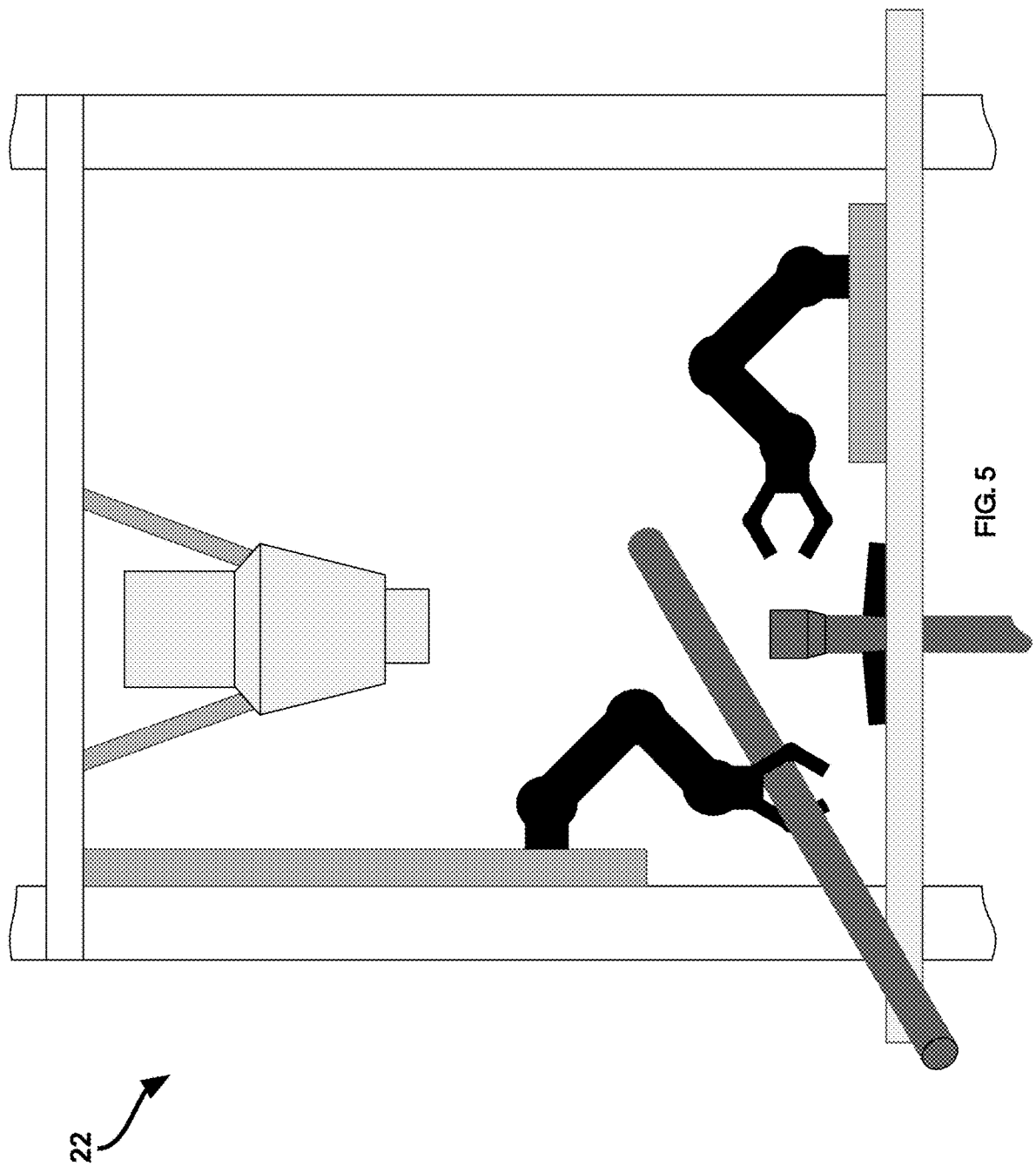
FIG. 5 is a front view of an exemplary robotic drilling system in accordance with the present disclosure.
Figure 6:
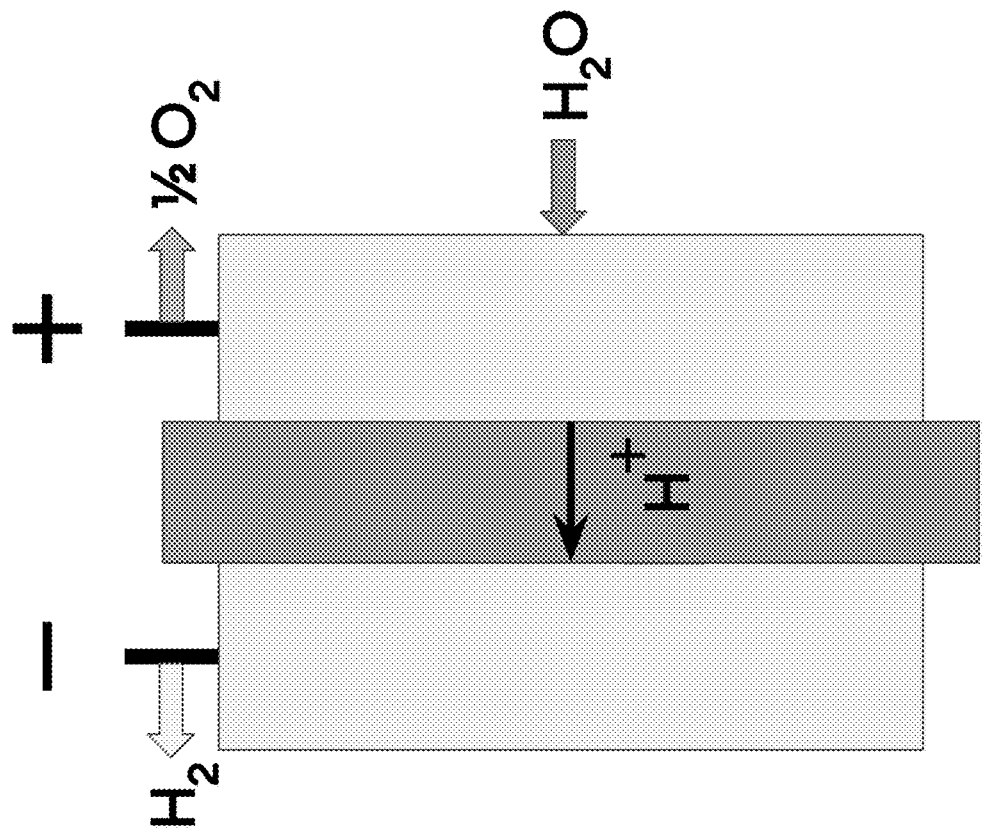
FIG. 6 is a front view of an exemplary electrolysis hydrogen and oxygen extraction system in accordance with the present disclosure.

Exemplary sequestration fields are developed using automated robotic drilling systems 22 and automated underwater work systems 20. The injection process may be aided by an underwater work apparatus 20 operatively connected to the disposal well 18. As shown in FIG. 5, in exemplary embodiments the system utilizes a robotic drilling system 22. Automated robotic drilling systems 22, automated loading systems 26, and/or automated underwater work systems 20 could be used to aid in injecting the greenhouse gases 16 into the geologic formation 12 and to coerce mineralization of the greenhouses gases, making the sequestration permanent. All these technologies have real-time adaptive robotic control for offshore, subsea, solidified sequestration of $CO_2$ via mineralization, i.e., the chemical reaction of $CO_2$ with certain types of subsea geologic formations. Thus, exemplary embodiments advantageously solidify the greenhouse gases 16 as mineral deposits permanently stored in geologic formations 12. These operations may take place in young basalt formations, as the most porous formations are the most suitable for $CO_2$ mineralization.

Disclosed embodiments do not sequester supercritical gases beyond initial injection as numerous other sequestration approaches do, so they do not require caprock above and around the sequestration reservoir. Instead, exemplary embodiments advantageously utilize $CO_2$ mineralization processes—which chemically react the $CO_2$ and water with certain types of geologic formations, permanently converting the $CO_2$ into a securely bonded mineral compound—to ensure that the sequestered compounds do not escape. $CO_2$ mineralization is currently being done onshore using freshwater, which is scarce in many regions. $CO_2$ mineralization can require up to 25 tons of water for every ton of $CO_2$ sequestered. With disclosed systems and methods, abundant seawater can be used for $CO_2$ mineralization, although freshwater as a byproduct from reverse osmosis $H_2$ generation can be added for improved mineralization efficiency.

Figure 2:
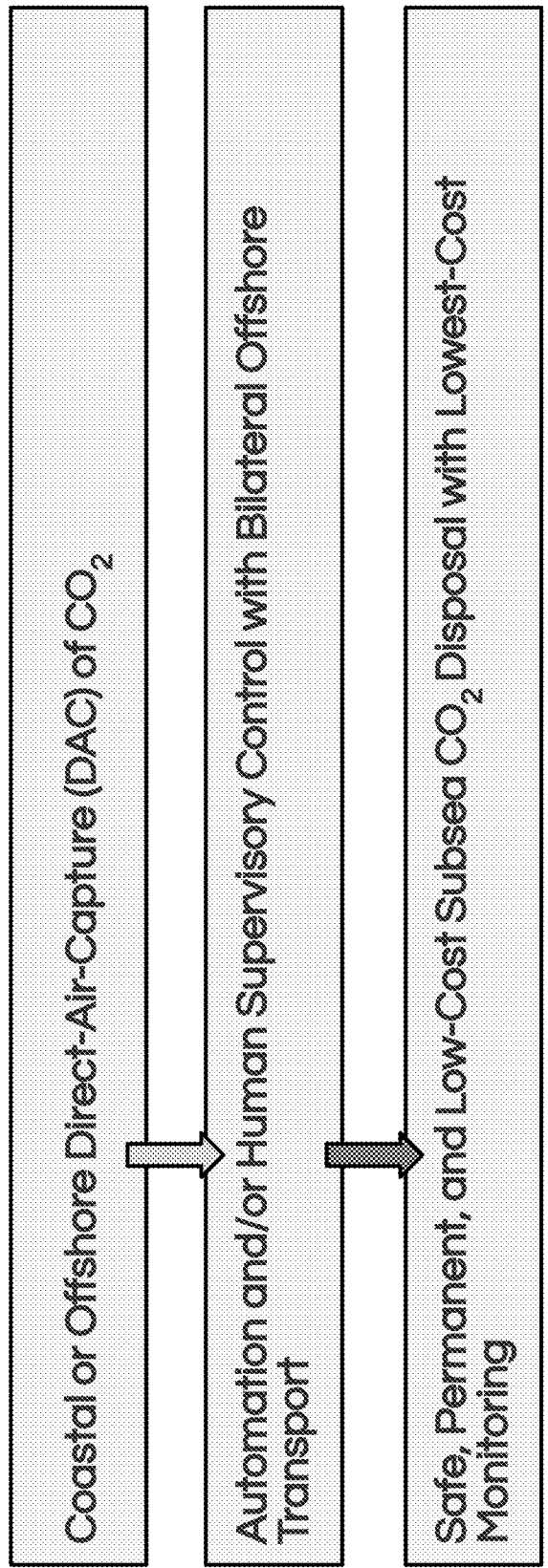
FIG. 2 is a process flow diagram of an exemplary method of greenhouse gas removal and sequestration in accordance with the present disclosure.

Freshwater can be produced by $H_2$ production methods known in the art such as electrolysis, reverse osmosis, through hydrogen fuel cells in excess of the amount required for hydrogen production, and/or any other known process to make hydrogen. The byproduct $H_2O$ can subsequently be transported to another area of need to prevent unladen transport or injected into the disposal well along with seawater to create brackish water that has an acceptable degree of salinity for mineralization of $CO_2$ in the targeted geologic formations. Unlike onshore mineralization in regions where freshwater is scarce, offshore mineralization offers unlimited water resources. This constitutes a significant advantage over inland DAC or inland source-captured $CO_2$ sequestrated as non-solid compounds because the sequestration takes place offshore or nearshore where water consumed as required for mineralization is plentiful. As shown in FIG. 2, operations of disclosed systems can be carbon-negative due to the use of DAC plants, sequestration fields, and offshore vessels powered by renewable, zero-emission energy.

It should be noted that the automated offshore robotics—such as proposed by disclosed processes—have yet to be applied to CCS by the offshore industry. These technologies increase onsite uptime and productivity beyond the capabilities of conventional drilling, installation, assembly, and Inspection, Maintenance, and Repair (IMR) operations. These improvements over traditional methods ensure that disclosed processes can achieve disposal and sequestration of $CO_2$ much faster than competing methods, and with higher volumes, lower costs, and much greater scalability potential.

For comparison, conventional offshore drilling operations can require 3-4 human operators on the drill floor with an additional human driller near the drill floor, for each 12-hour shift, to connect or disconnect drill string segments that are typically 31 feet long into as much as 45,000 feet of connected drill pipe for one-way component travel. This means that more than 2,900 physical connections must be made for each tooling component's round-trip travel. Conversely, an automated robotic drilling system requires only two human operators per day to direct drilling operations and complete the same operations. Even if the actual drilling occurs offshore, automated robotic drilling operators can be located onshore, which reduces travel expenses, lowers the $CO_2$ footprint, improves employee quality-of-life, and improves other health, safety and environmental (HSE) factors.

As one example of the many ways automated robotic drilling systems dramatically improve efficiency and efficacy offshore, a "hot-stab" insertion into a remotely-operated vehicle (ROV) panel using automated real-time adaptive robotics takes roughly 90% less time than conventional, non-automated/non-robotic control and makes these operations consistently repeatable. Other tasks such as tool retrieval from a system experiencing constant randomized passive motion underwater were previously impractical but are now a predictable and standard part of subsea oil and gas production operations and can be utilized in sequestration operations.

After field development, the sequestration sites may require periodic IMR until the sequestered $CO_2$ is mineralized. The disclosed processes advantageously eliminate the need for reservoir monitoring within 2-5 years because the reservoir self-encapsulates during the $CO_2$ mineralization process. Along with rapid $CO_2$ mineralization, the disclosed process uses automated drilling systems and automated underwater work systems to also decrease IMR, later plugging and abandonment, and for equipment retrieval task timelines rather than continuously monitoring the sequestration site. This is an expensive and ongoing requirement for $CO_2$ which is sequestered as a supercritical gas. Exemplary embodiments negate the need for long-term monitoring.

The retrieved equipment is then refurbished and reinstalled at the next sequestration site. More particularly, the rapid drilling, completion, injection, and mineralization at sequestration sites allows high-cost equipment to be recovered, refurbished, and reused for substantial cost savings per unit of $CO_2$ sequestered by spreading the cost of such equipment across many sequestration wells and numerous fields through its reuse.

Figure 3:
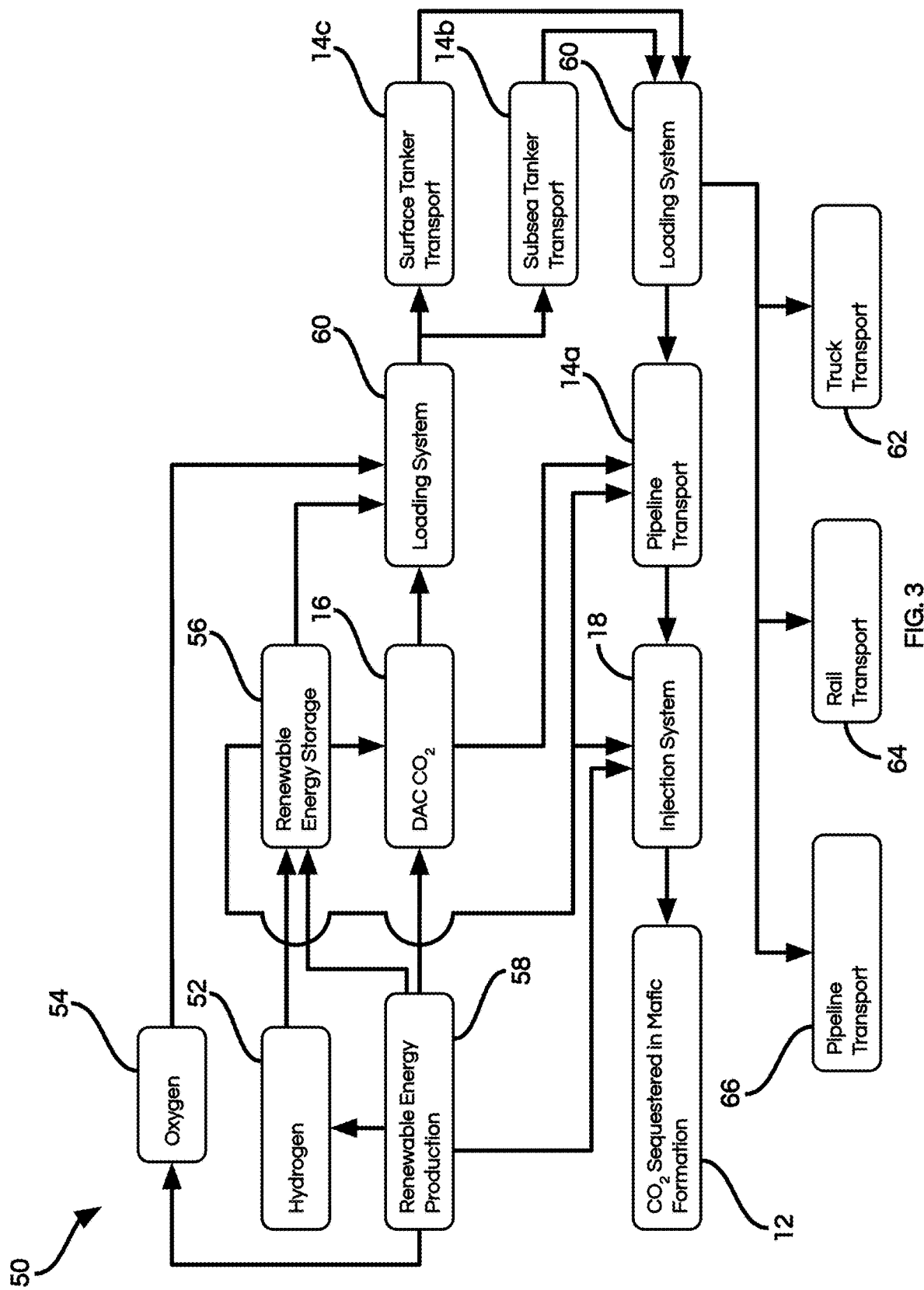
FIG. 3 is a process flow diagram of an exemplary method of greenhouse gas removal and sequestration and hydrogen utilization in accordance with the present disclosure.

Turning to FIGS. 3 and 5, exemplary systems include an electrolysis hydrogen and oxygen extraction system 24, e.g., an electrode if using electrolysis, and exemplary methods produce and utilize hydrogen ($H_2$) 52 to store energy 56 and power the system's components/operations offshore by utilizing local wind, solar, wave, or other forms of zero-emission renewable energy to extract hydrogen from seawater. FIG. 3 shows the process flow of an exemplary hydrogen utilization process 50. Renewable energy is produced 58, and the renewable generated energy source is used to power water-splitting processes as well as to capture the resultant gases. The captured $H_2$ can be stored 56 and later used as an energy source or transported to other systems. Depending on the method of $H_2$ production, $H_2O$ and $O_2$ 54 are also created. These byproducts and excess $H_2$ can be utilized onsite for energy storage 56, $CO_2$ mineralization, or shipped back to shore for industrial use. If being shipped, the hydrogen 52 can be loaded onto transport apparatus 14a, 14b, 14c via a loading system 60. Once on shore, a loading system 60 could be used to load the hydrogen 52 for truck transport 62, railroad transport 64, and/or terrestrial pipeline transport 66.

Exemplary transport vessels also offer bilateral laden transport and are carbon-neutral when used with renewable energy. With this option, $CO_2$ is transported outbound from the onshore or offshore DAC facilities via surface or subsea transport vessels or pipelines, and excess $H_2$, $H_2O$, $O_2$, or other gaseous, liquid, or semi-liquid/solid products can be utilized onsite or returned to shore, ensuring fully laden transport.

$H_2$ also can be offloaded directly from surface infrastructure such as drill ships, semi-submersibles, Floating Production Storage and Offloading (FPSO) vessels, floating gas carriers 23, and gas carrier docking turrets 25, etc., or via automated loading systems 26. The offloaded $H_2$ could be transported by surface transfer or subsea connector docking for subsea transport vessel cargo loading and offloading via remotely operated and supervised underwater work systems during rendezvous operations with $H_2$ powered ocean vessels of opportunity. Excess $H_2$ can also be transported to other wind-to-$H_2$ powered sequestration sites where the local $H_2$ supply has been depleted or where a lack of wind has slowed wind turbine electric power generation below site power storage specifications.

Figure 4:
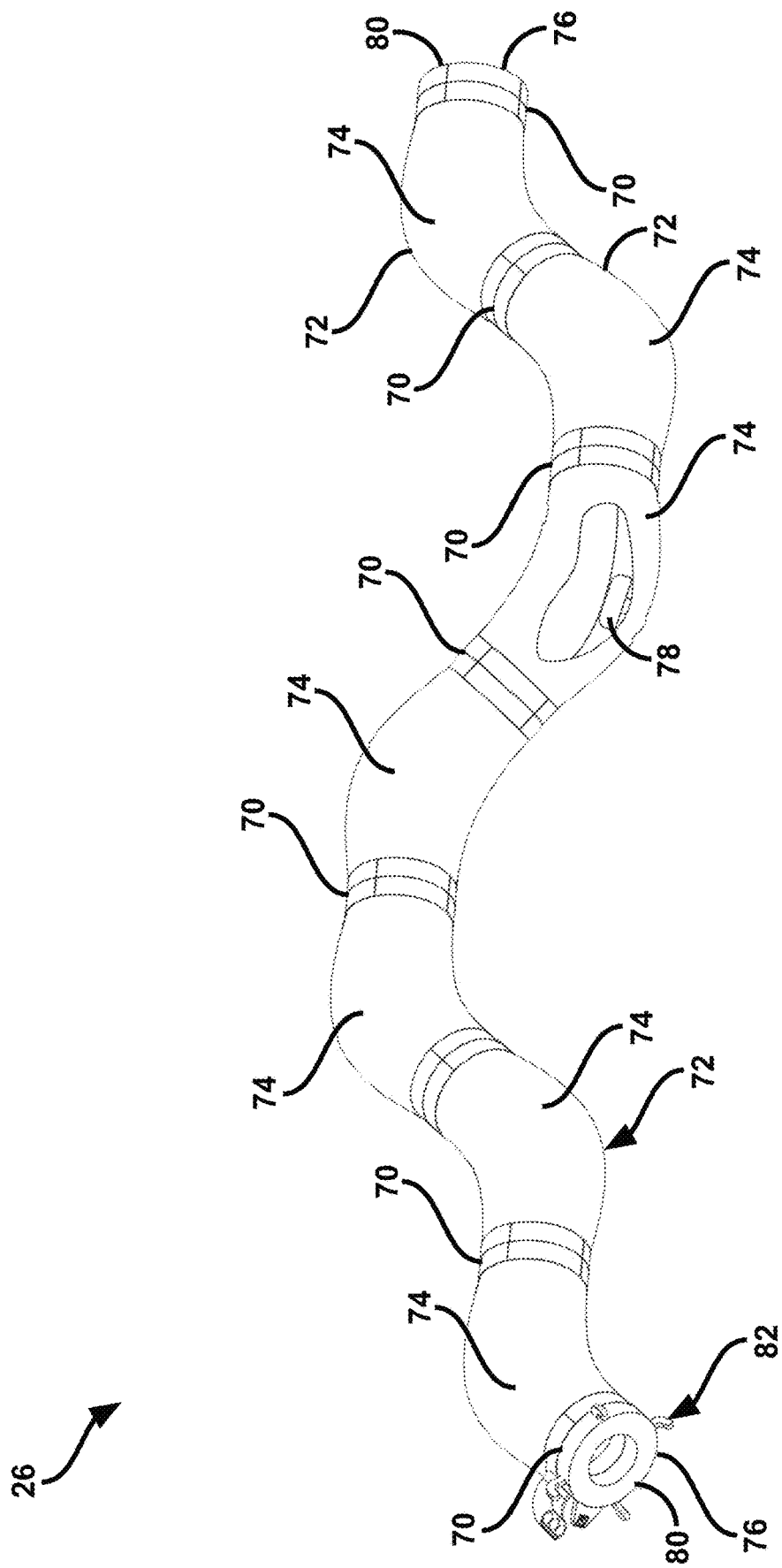
FIG. 4 is a perspective view of an exemplary loading system in accordance with the present disclosure.

Turning to FIG. 4, an exemplary embodiment of a loading system 26 will now be described. An exemplary loading system 26 is an advantageously modular and reconfigurable transfer system manipulator. It may have independently actuatable joints 70 ranging from a single axis-of-rotation through unlimited kinematically redundant configurations that may include bifurcations 72 and multiple disjointed systems where all may operate collaboratively and cooperatively. The loading system 26 may have an internal flexline with external (exoskeletal) rotational joint modules 74 connected to match the length of the internal flexline. One or more of the joint modules 74 may include a flow control check valve 76. In some instances, these loading systems may be used as jumpers between sequestration components.

In some instances, the joint modules 74 may have an angular offset from their axis of rotation; in other cases, the joint modules 74 have no angular offset from their axis of rotation. In a loading system 26, some of the joint modules 74 may have an angular offset while others do not. In exemplary embodiments, the joint modules 74 self-align their rotational angles to continuously adapt to and achieve the optimal pose for a given kinematic solution, which may be updated at any time in response to environmental or system perturbations. In some instances, kinematically redundant joint segments may rotate joint features against counteracting proximal and distal joint segment features, creating an additional method of product transfer.

In exemplary embodiments, joint modules 74 may include additional variably actuatable internal protrusions 78, which can contact and deflect the flexline surface when rotated around the flexline to displace the internal product creating peristaltic flow relative to the density and viscosity of the product being transferred. The joint modules 74 may be filled with incompressible media that are displaced to a pressure compensator when the internal protrusions are actuated. The amounts of pressure and flow are variable and based on joint module rotation, direction, speed, and the extent of internal protrusion.

The loading system 26 may also have actuator flanges 80. In exemplary embodiments, the most distal and proximal actuator flanges 80 may include a docking mechanism 82 to attach the most distal and proximal joint modules 74 to a receptacle. The flange docking mechanisms 82 may include an articulated and actuatable energy absorbing mechanism and may include sensing and sensable subsystems to localize the flange relative to the system and its environment. The flange docking mechanisms 82 also may include a provision to spray a cleaning media over the item to be grappled.

Regardless of the number of joints 70 that comprise the loading system 26, the forward and inverse kinematics of the loading system 26 and any subsystems are calculated in such a way as to allow the distal docking mechanism to attach to a grapple fixture and release the proximal docking mechanism from a separate grapple fixture, which then allows the previously proximal and newly distal flange docking mechanism to translate to a location where it can dock to a separate fixture allowing end-over-end system translation. Advantageously, loading system 26 may be used in terrestrial and/or subsea applications and is operable in remote applications.

In operation, greenhouse gases 16, e.g., carbon dioxide, are removed from the atmosphere by direct air capture device 10. The $CO_2$ 16 is transported outbound from the onshore or offshore DAC facilities 10 via one or more transport apparatus 14a, 14b, 14c. Exemplary $CO_2$ transport modes include pipelines, tiebacks, and both surface and subsea transport vessels. Offshore pipelay and tiebacks to shore can be used, and thus overland pipeline construction is not required. Additional transport modes include offshore onsite floating DAC vessels for $CO_2$ capture and injection and $CO_2$ pipelines/tiebacks to transport $H_2$ to shore.

The transport apparatus 14a, 14b, 14c transports the carbon dioxide 16 to pre-drilled and completed subsea disposal wells 18 where the $CO_2$ is then injected deep underground and solidified as mineral deposits permanently stored in geologic formations 12. In exemplary embodiments, disposal wells are drilled and completed using automated and robotic systems. GHGs (primarily $CO_2$) 16 are sequestered as minerals (rather than being stored in supercritical phases) such that impermeable caprock is not required.

Over- and underwater bilaterally laden transport is possible through $CO_2$ captured onsite, offshore, or onshore and with outbound transport from shore and where $H_2$, $O_2$, or other offshore produced compounds can be returned to shore or to other offshore systems by one of several same transport systems to minimize unladen transport. The products to be transported do not need to be pure elements or compounds and can include varying viscosity liquids such as high-density energy storage $H_2$ pastes.

Disclosed processes also (optionally) include unique systems and methods for achieving "sequestration-as-a-service." More particularly, associated sequestration space for $CO_2$ mineralization subsea geologic formations can be sold to sequestration-as-a-service customers or awarded as a share of a sequestration project. This provides an "outsourced" sustainability mechanism for organizations which are unable to cost-effectively decarbonize their operations on their own.

It also provides such customer organizations with $CO_2$ emissions-related compliance and favorable reporting for new climate change and investment requirements and standards such as the Sustainability Accounting Standards Board (SASB), Task Force for Climate-Related Financial Disclosures (TCFD), and the Carbon Disclosure Project (CDP). Disclosed systems could be located in the U.S. maritime zone approved for 45Q tax incentives. The net effect of this is that the processes can remove the amount of $CO_2$ from the atmosphere which will match or exceed the amount of decarbonization and sequestration a customer needs to achieve for internal or external reasons/mandates. Thus, organizations engaging in decarbonization can achieve carbon-negative or carbon-neutral status through quantifiable and verifiable $CO_2$ sequestration-as-a-service.

As another element of the unique integration of exemplary systems and methods, shares of offshore subsea "sequestration leases" representing a predetermined amount of $CO_2$ storage in metric tons (t) can be sold to organizations seeking to reduce or eliminate the impact of their own (or others') carbon emissions through sequestration-as-a-service. In disclosed processes the leased acreage is for the purpose of permanently sequestering $CO_2$ in the subsea acreage (not for the production of oil and gas or minerals). The sale of these sequestration lease shares can ultimately provide funding for disclosed commercial CCS operations. As a related element of the disclosed systems and methods, these sequestration leases and/or the rights to store $CO_2$ within the leased formations may be "securitized" by selling shares of a portfolio of these $CO_2$ storage fields for financial diversification, capital raising, and other purposes.

In addition, because embodiments involve an inverse application and integration of oil and gas technologies, this industry would benefit from deployment. The energy transition path for the existing offshore energy industry can produce overall employment gains through an ensuing, larger carbon dioxide removal industry which is enabled by disclosed processes Thus, it is seen that systems and methods of greenhouse gas removal with permanent subsea sequestration are provided. While the disclosed systems and methods have been described in terms of what are presently considered to be the most practical exemplary embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should be understood that any of the foregoing configurations and specialized components may be interchangeably used with any of the systems of the preceding embodiments. Although illustrative embodiments are described hereinabove, it will be evident to one skilled in the art that various changes and modifications may be made therein without departing from the disclosure. It is intended in the appended claims to cover all such changes and modifications that fall within the true spirit and scope of the disclosure.

What is claimed is:

1. A system of greenhouse gas removal and subsea sequestration integrating oil and gas transport systems, comprising:
   at least one direct air capture device capturing one or more greenhouse gases from the atmosphere;
   at least one transport apparatus configured to be fluidly connected to the at least one direct air capture device;
   at least one underwater disposal well configured to be fluidly connected to the at least one transport apparatus;
   at least one underwater work apparatus configured to work with the at least one underwater disposal well; and
   a robotic drilling system;
   wherein the at least one transport apparatus transfers the one or more greenhouse gases to the at least one underwater disposal well; and
   wherein the at least one underwater disposal well injects the one or more greenhouse gases into an underwater geologic formation.

2. The system of claim 1 wherein the at least one transport apparatus is one or more of: a mobile surface vessel, a mobile underwater vessel, a tieback, or a pipeline.

3. The system of claim 1 wherein the at least one direct air capture device is located on a coast or is located offshore floating on a body of water.

4. The system of claim 1 further comprising an electrolysis hydrogen and oxygen extraction system.

5. The system of claim 4 wherein the system of greenhouse gas removal and subsea sequestration utilizes extracted hydrogen to store energy and provide power.

6. The system of claim 1 further comprising at least one loading system configured to connect to the at least one transport apparatus.

7. The system of claim 6 wherein the loading system comprises an internal flexline and a plurality of external rotational joint modules connected to match the length of the internal flexline, the loading system being modular and reconfigurable; and
   wherein each joint module has an angular offset from its axis of rotation.

8. The system of claim 1 wherein the loading system further comprises a plurality of variably actuatable internal protrusions.

9. The system of claim 8 wherein the variably actuatable internal protrusions contact and deflect a flexline surface, creating peristaltic flow of a product being transferred.

10. The system of claim 9 wherein the external rotational joint modules are filled with incompressible media that are displaced to a pressure compensator when the variably actuatable internal protrusions are actuated.

11. The system of claim 1 wherein the loading system further comprises a flange docking mechanism including an articulated and actuatable energy absorbing mechanism.

12. The system of claim 1 wherein the at least one transport apparatus transports gaseous, liquid, or semi-liquid products to shore, thereby being utilized for bilateral fully laden transport.

13. A system of greenhouse gas removal and subsea sequestration, comprising:
- at least one direct air capture device capturing one or more greenhouse gases from the atmosphere;
- at least one transport apparatus configured to be fluidly connected to the at least one direct air capture device;
- at least one underwater disposal well configured to be fluidly connected to the at least one transport apparatus;
- at least one underwater work apparatus configured to work with the at least one underwater disposal well;
- at least one loading system configured to connect to the at least one transport apparatus, the at least one loading system having a plurality of external rotational joint modules, each external rotational joint module having an angular offset from its axis of rotation; and
- an electrolysis hydrogen and oxygen extraction system;
- wherein the at least one transport apparatus transfers the one or more greenhouse gases to the at least one underwater disposal well; and
- wherein the at least one underwater disposal well injects the one or more greenhouse gases into an underwater geologic formation.

14. The system of claim 13 wherein the plurality of external rotational joint modules are connected by independently actuatable joints.

15. The system of claim 14 wherein the rotatable joint modules self-align their rotational angles to adapt to a given kinematic solution.

16. The system of claim 14 wherein the loading system further comprises one or more actuator flanges and at least one of the actuator flanges includes a docking mechanism.

17. The system of claim 13 wherein the transport apparatus is one or more of: a mobile surface vessel, a mobile underwater vessel, a tieback, or a pipeline.

18. The system of claim 13 wherein the direct air capture device is located on a coast or is located offshore on a body of water.

19. A system of greenhouse gas removal and subsea sequestration, comprising:
- at least one direct air capture device capturing one or more greenhouse gases from the atmosphere;
- at least one transport apparatus configured to be fluidly connected to the at least one direct air capture device;
- at least one underwater disposal well configured to be fluidly connected to the at least one transport apparatus;
- at least one underwater work apparatus configured to work with the at least one underwater disposal well; and
- at least one loading system configured to connect to the at least one transport apparatus, the at least one loading system having a plurality of external rotational joint modules, each joint module having an angular offset from its axis of rotation;
- wherein the at least one transport apparatus transfers the one or more greenhouse gases to the at least one underwater disposal well; and
- wherein the at least one underwater disposal well injects the one or more greenhouse gases into an underwater geologic formation.

* * * * *